United States Patent
Woods et al.

(10) Patent No.: US 10,832,216 B2
(45) Date of Patent: Nov. 10, 2020

(54) SYSTEM AND METHOD FOR FACILITATING CLEARANCE OF ONLINE CONTENT FOR DISTRIBUTION PLATFORMS

(71) Applicant: DISNEY ENTERPRISES, INC., Burbank, CA (US)

(72) Inventors: Michael Woods, Burbank, CA (US); Ryan Lissack, Burbank, CA (US); Christine Ordaz, Burbank, CA (US); Yael Miller, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 895 days.

(21) Appl. No.: 15/134,335

(22) Filed: Apr. 20, 2016

(65) Prior Publication Data
US 2017/0308857 A1   Oct. 26, 2017

(51) Int. Cl.
*G06Q 10/10*   (2012.01)
*G06F 16/70*   (2019.01)
*G06F 16/732*  (2019.01)

(52) U.S. Cl.
CPC .......... *G06Q 10/103* (2013.01); *G06F 16/70* (2019.01); *G06F 16/7328* (2019.01)

(58) Field of Classification Search
CPC .... G06Q 10/103; G06F 16/70; G06F 16/7328
See application file for complete search history.

(56) References Cited

U.S. PATENT DOCUMENTS

| | | | |
|---|---|---|---|
| 6,937,730 B1* | 8/2005 | Buxton | H04N 7/163 348/E7.061 |
| 2004/0220926 A1* | 11/2004 | Lamkin | G06F 21/10 707/999.003 |
| 2009/0031216 A1* | 1/2009 | Dressel | G06F 16/958 715/255 |
| 2009/0154806 A1* | 6/2009 | Chang | G06F 16/70 382/173 |
| 2013/0238901 A1* | 9/2013 | Wise | H04N 1/32702 713/168 |
| 2014/0280377 A1* | 9/2014 | Frew | G06F 17/241 707/805 |

* cited by examiner

*Primary Examiner* — Kannan Shanmugasundaram
(74) *Attorney, Agent, or Firm* — Esplin & Associates, PC

(57) ABSTRACT

Systems and methods for providing clearance workflows for facilitating clearance of online content for distribution platforms. The online content may be obtained and may include an individual online content. A clearance workflow for the individual online content may be identified. The clearance workflow may include an itemized representation of clearance items to be addressed for clearance of the individual online content. The clearance workflow may be stored in electronic storage. Fulfillment information indicating that one or more of the clearance items included in the clearance workflow has been addressed may be obtained. The fulfillment information may identify which of the one or more clearance items have been addressed. The clearance workflow stored in the electronic storage for the individual online content may be updated in a reoccurring or ongoing manner.

22 Claims, 3 Drawing Sheets

SYSTEM AND METHOD FOR FACILITATING CLEARANCE OF ONLINE CONTENT FOR DISTRIBUTION PLATFORMS

FIELD OF THE INVENTION

The disclosure relates to systems and methods configured for facilitating clearance of online content for distribution platforms.

BACKGROUND OF THE INVENTION

Online content may be created by a variety of users and hosted on a variety of platforms. The variety of platforms may have varying requirements and/or parameters for the online content they host. An entity may monetize online content created by a network of users associated with the entity. The online content controlled by the entity may consist of large quantities of short form content that must be cleared prior to distribution via the variety of platforms. Different platforms may have different requirements for online content published via their platform. As such, the online content must be specifically prepared, modified, and/or edited for individual platforms. Typically, this is a manual process. Thus, clearing a high quantity of lower value online content to be distributed via multiple platforms may be inefficient and costly.

SUMMARY

The disclosure herein relates to providing clearance workflows for facilitating clearance of online content for distribution platforms. The clearance workflows may indicate items to be addressed within online content in order to clear the online content for distribution. The clearance workflows may streamline and/or automate various aspects of the clearance process for the online content. This may enable large quantities of online content to be cleared for a variety of distribution platforms more efficiently. As one or more items within a clearance workflow are addressed, the clearance workflow may be updated to reflect the remaining items to be addressed. The system and/or method may further automate the clearance process by automatically editing the online content based on the clearance workflow.

A system configured for providing clearance workflows for facilitating clearance of online content to be distributed may include a server and/or one or more client computing platforms. The server and the client computing platforms may communicate in a client/server configuration and/or other configuration. The server may include one or more processors configured by machine-readable instructions to execute computer program components. The computer program components may include a content component, a clearance workflow component, an editing component, a fulfillment component, an updating component, a presentation component, and/or other components.

The content component may be configured to obtain online content. The online content may include one or more individual online content hosted over a network. Obtaining online content hosted over a network may include requesting the online content from one or more servers that deliver the online content to the content component. The online content may include online media content, for example, video content, audio content, image content, and/or other online media content. The online content may be obtained from one or more sources. The sources may include distribution platforms through which the online content is submitted, presented, and/or consumed by users.

The clearance workflow component may be configured to identify a clearance workflow for the online content. The clearance workflow may include an itemized representation of clearance items to be addressed for clearance of the online content. In some implementations, the online content has to be cleared and/or authorized for distribution prior to its distribution via one or more distribution channels. An itemized representation of clearance items may include one or more of a list, check list, flow diagram, notification wizard, and/or other itemized representation that indicates the clearance items within a given online content.

The clearance items may include one or more of clearance events occurring within a duration of the online content, parameter guidelines for the online content, supplemental content requirements for the online content, content to be removed or replaced within the duration of the online content, and/or other clearance items within the online content. The one or more clearance items may be associated with time indications indicating one or more points in time within the duration of the online content that the associated clearance items are directed to.

The clearance events may include one or more events that may indicate potential issues with the online content. For example, clearance events may include one or more of the presentation of restricted content within the online content, the presentation of protected content within the online content, the presentation of a specific type of content within the online content, the presentation of content related to a specified topic within the online content, and/or other events within the duration of the online content. The parameter guidelines for the online content may include limitations and/or requirements for one or more parameters associated with the online content. For example, the parameters may include a length of the online content, a size of the online content, resolution of the online content, a format of the online content, a bit rate of the online content, and/or other parameters of the online content.

The supplemental content requirements for the online content may include requirements and/or parameters for one or more of metadata, thumbnail information, a tag, a title, an advertisement, an end plate, a description, a caption, and/or other supplemental content associated with the online content. The content to be removed and/or replaced within the duration of the online content may indicate content that should and/or has to be removed from the online content prior to distribution. For example, one or more of cropped content, audio content, explicit content, undesired content, and/or other content to be removed or replaced.

In some implementations, the clearance workflow component may be configured to obtain clearance item information indicating the clearance items to be addressed for clearance of the online content. The clearance item information may be obtained from one or more client computing platforms associated with a user (e.g., an editing entity, a content manager, a content verifier, a talent and/or producer of the online content, and/or other user and/or entity that may control and/or modify the online content). The clearance item information may be based on one or more of the user's selection and/or identification of the clearance items within the online content.

In some implementations, the clearance workflow component may be configured to obtain the clearance item information from metadata associated with the online content. The metadata may be generated by processing the online content to identify one or more clearance items within the online content. The metadata may include one or more clearance items, time indications, and/or other content.

The clearance workflow component may be configured to determine one or more distribution platforms the online content should be distributed to. Some distribution platforms may have different parameters, requirements, objectives, and/or other qualifications for the online content distributed than other distribution platforms. The clearance workflow component may be configured to identify the clearance workflow based on a given distribution platform to which the individual content should be distributed. As such, the clearance workflow identified may reflect and/or correspond to the parameters, requirements, objectives, and/or other qualifications associated with the given distribution platform.

The clearance workflow component may be configured to store the clearance workflow in the electronic storage. The editing component may be configured to transmit the online content to a client computing platform associated with an editing entity for addressing one or more of the clearance items. In some implementations, the editing component may be configured to edit the online content. Editing the online content may include automatically editing and/or performing a quick edit of the online content according to the clearance items included in the identified clearance workflow for the online content and/or the time indications associated with the clearance items.

The fulfillment component may be configured to obtain fulfillment information indicating that one or more of the clearance items included in the clearance workflow have been addressed. The fulfillment information may identify which of the one or more clearance items have been addressed such that they may be removed from the clearance workflow. In some implementations, the fulfillment information may be obtained from one or more of the editing component, a client computing platform associated with an editing entity and/or user, an interface associated with an editing entity, and/or other sources.

The updating component may be configured to update the clearance workflow. The clearance workflow may be updated in a reoccurring and/or ongoing manner. The updating component may be configured to update the clearance workflow for the online content such that the addressed clearance items are removed and/or otherwise indicated as addressed, and the items to be addressed are included in the itemized representation of clearance items.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Figure 1:
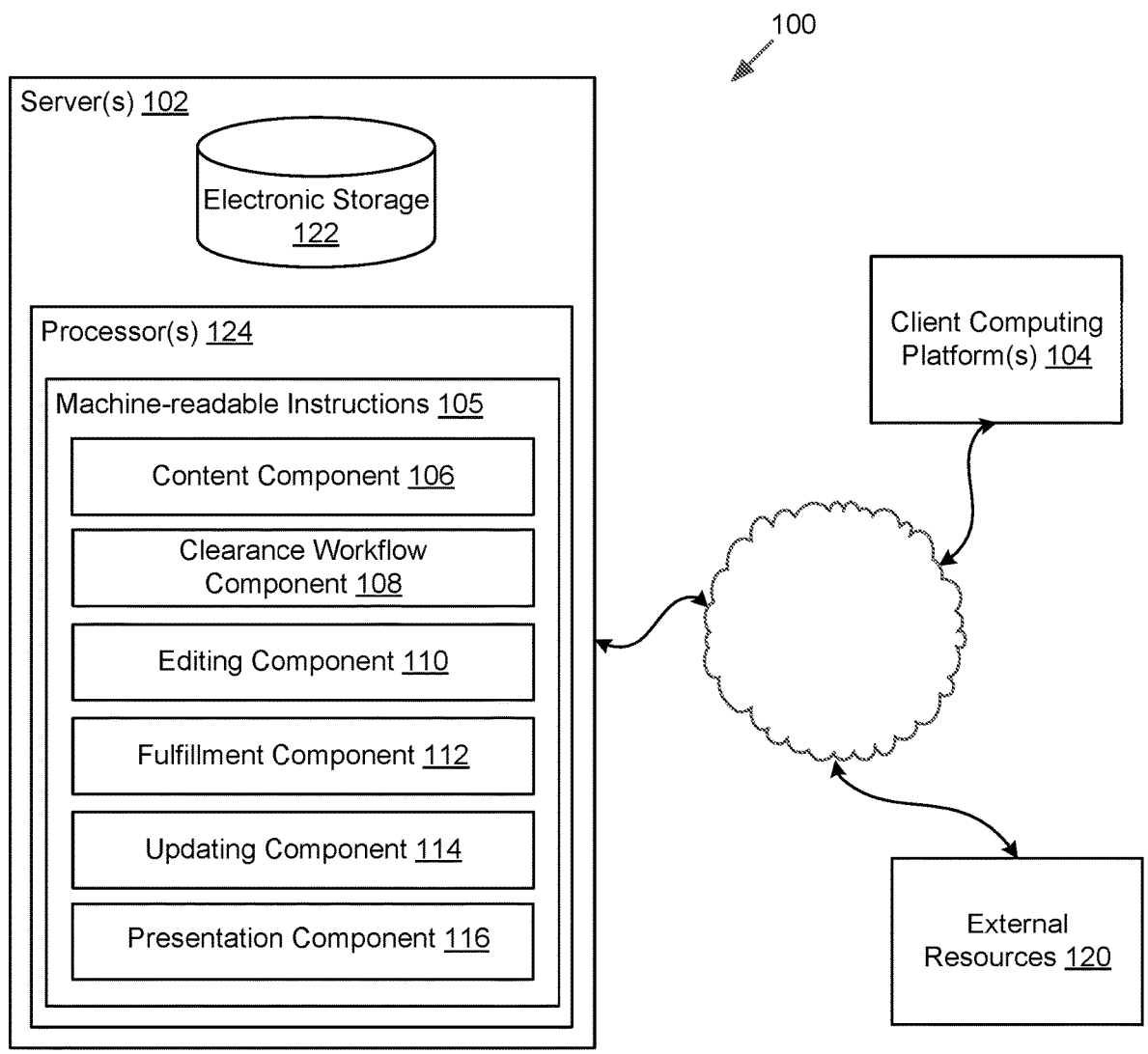
FIG. 1 illustrates a system configured for providing clearance workflows for facilitating clearance of online content to be distributed, in accordance with one or more implementations.

FIG. 1 illustrates an example system 100 that is configured for providing clearance workflows for facilitating clearance of online content to be distributed. The clearance workflows may include an itemized representation of clearance items to be addressed for clearance of the online content. As clearance items within the clearance workflow are addressed, the clearance workflow may be updated to reflect the remaining items to be addressed. The system and/or method may include automatically editing one or more aspects of the online content based on the clearance workflow to further automate the clearance process. As illustrated in FIG. 1, system 100 may include one or more server(s) 102, one or more client computing platform(s) 104, electronic storage 122, one or more physical processor(s) 124 configured to execute machine-readable instructions 105, one or more computer program components, and/or other components.

One or more physical processor(s) 124 may be configured to execute machine-readable instructions. Executing machine-readable instructions 105 may cause the one or more physical processor(s) 124 to provide clearance workflows for facilitating clearance of online content. Machine-readable instructions 105 may include one or more computer program components such as a content component 106, a clearance workflow component 108, an editing component 110, a fulfillment component 112, an updating component 114, a presentation component 116, and/or other components.

In some implementations, server(s) 102 may be configured to provide remote hosting of the features and/or function of machine-readable instructions 105 to one or more client computing platform(s) 104 that may be remotely located from server(s) 102. However, in some implementations, one or more features and/or functions of server(s) 102 may be attributed as local features and/or functions of one or more client computing platform(s) 104. For example, individual ones of the client computing platform(s) 104 may include machine-readable instructions (not shown in FIG. 1) comprising the same or similar components as machine-readable instructions 105 of server(s) 102. The client computing platform(s) 104 may be configured to locally execute the one or more components that may be the same or similar to the machine-readable instructions 105. One or more features and/or functions of machine-readable instructions 105 of server(s) 102 may be provided, at least in part, as an application program that may be executed at a given client computing platform 104.

The client computing platform(s) 104 may include one or more of a cellular telephone, a smartphone, a digital camera, a laptop, a tablet computer, a desktop computer, a television set-top box, smart TV, a gaming console, and/or other platforms.

Server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting and that the scope of this disclosure includes implementations in which server(s) 102, client computing platform(s) 104, and/or external resources 120 may be operatively linked via some other communication media.

Content component 106 may be configured to obtain online content. The online content may be hosted over a network. The online content may include an individual online content. As used herein, the online content may refer to and/or include one or more individual online content. Obtaining online content hosted over a network may include requesting the online content from one or more servers that deliver the online content to content component 106. Obtaining the online content may include receiving separate digital files for the online content, streaming the online content, and/or other receiving mechanisms. Online content may be online media content. For example, online content may include video content, audio content, image content, and/or other online media. The online content may be obtained from one or more sources. In some implementations, one or more sources may include distribution platforms through which the online content is submitted, presented, and/or consumed by users. The one or more sources may include, for example, one or more of YOUTUBE®, MAKER.TV®, SNAPCHAT® FACEBOOK®, VINE®, VIMEO®, INSTAGRAM®, TWITTER®, MYSPACE®, GOOGLE+®, a channel associated with a source, a online content manager associated with system 100 (e.g., via which talent and/or content producers submit online content), and/or other sources.

Obtaining the online content may include ingesting the online content from one or more online content distribution platforms into system 100. For example, content component 106 may be configured to ingest high quantities (e.g., tens of thousands) of short-form online content (e.g., video content, etc.). In some implementations, the online content ingested may have one or more commonalities. For example, the ingested online content may be created by users and/or talent within a given network of users and/or talent.

Clearance workflow component 108 may be configured to identify a clearance workflow for the online content. The clearance workflow may include an itemized representation of clearance items to be addressed for clearance of the online content. Clearance of the online content may describe authorization of the online content for distribution via one or more distribution channels. An itemized representation of clearance items may include one or more of a list, check list, flow diagram, and/or notification wizard that identifies the clearance items within a given online content. Clearance items may include one or more aspects of and/or items within the online content to be addressed before the online content is cleared for distribution.

The clearance items may include one or more of clearance events occurring within a duration of the online content, parameter guidelines for the online content, supplemental content requirements for the online content, content to be removed or replaced within the duration of the online content, and/or other clearance items within the online content. The one or more clearance items may be associated with time indications indicating one or more points in time within the online content that the associated clearance items are directed to. In some implementations, the online content may include a duration such that the time indication may indicate one or more points in time within the duration of the online content. The points in time may include a starting point indicating a beginning time related to a clearance item, an ending point indicating an ending time related to a clearance item, and/or other points in time.

The clearance events occurring within a duration of the online content may include one or more events that may indicate potential issues with the online content. For example, clearance events may include one or more of the presentation of restricted content within the online content, the presentation of protected content within the online content, the presentation of a specific type of content within the online content, presentation of content related to a specified topic within the online content, and/or other events within the duration of the online content.

Restricted content may include content that should be limited in distribution in order to protect one or more interests associated with the content. Restricted content may include faces of bystanders, license plates of cars, addresses, phone numbers, and/or other restricted content presented within the online content. For example, to protect the interests of individuals who are bystanders, faces may be blurred within the online content. Thus, a clearance event may include the presentation of a face of a bystander within the duration of the online content, and/or the time indication may indicate one or more points in time a face of a bystander appears within the duration of the online content.

Protected content may include content that one or more entities have a protected interest in. Protected content may include one or more of trademarked content, copyrighted content, trade secret content, and/or other protected content. Thus, a clearance event may include the presentation of a scene from a copyrighted movie within online content, and/or the time indication may indicate a starting point in time, an ending point in time, and/or a time segment, within the duration of the online content that the scene is presented.

The presentation of a specific type of content within the online content may include the presentation of music content, mature content, foreign content (e.g., in a foreign language), and/or other specific types of content. As such, a clearance event may include the presentation of a dialogue in Spanish within online content, and/or the time indication may indicate a starting point in time, an ending point in time, and/or a time segment, within the duration of the online content that the dialogue is presented.

Content related to a specified topic within the online content may include content related to one or more topics identified. For example, an identified topic may include politics such that a clearance event may include a political reference within the online content, and/or the time indication may indicate one or more points in time the political reference is presented within the online content.

Clearance items may include one or more parameter guidelines for the online content. The parameter guidelines for the online content may describe limitations and/or requirements for one or more parameters of the online content. For example, the parameters may include one or more of a length of the online content, a size of the online content, resolution of the online content, a format of the online content, a bit rate of the online content, and/or other parameters of the online content. The limitations and/or requirements may include a maximum, minimum, and/or a range of parameters that define the parameter guidelines of the online content. For example, a parameter guideline for a video may include a maximum length of the video such as 15 seconds. The parameter guidelines may describe the required length, size, resolution, format, bit rate, and/or other parameters for online content to be distributed via a given distribution platform.

In some implementations, clearance items may include one or more supplemental content requirements for the online content. The supplemental content requirements may describe requirements or parameters for supplemental content associated with the online content. Supplemental content associated with the online content may include one or more of metadata, thumbnail information, a tag, a title, an advertisement, an end plate, a description, a caption, and/or other supplemental content associated with the online content. For example, supplemental content requirements for a given distribution platform may indicate a specific link must be present in within the end plate of the online content. For another distribution platform, supplemental content requirements may require that the title associated with the online content is 50 characters or less.

In some implementations, clearance items may include content to be removed or replaced within the duration of the online content. Content to be removed or replaced may include, for example, one or more of cropped content, audio content, explicit content, undesired content, and/or other content to be removed or replaced. For example, a clearance item may indicate replacing a song within the online content and/or removing background noise within the online content.

In some implementations, clearance workflow component 108 may be configured to obtain clearance item information indicating the clearance items to be addressed for clearance of the online content. The clearance item information may include the time indications indicating points in time within the duration of the online content that the clearance items are directed to. In some implementations, the clearance item information may include other information related to the clearance item such as a description of the clearance item, and/or other information. The clearance workflow component 108 may be configured to identify the clearance workflow for a given online content based on the clearance information associated with the given online content.

In some implementations, the clearance item information may be obtained by clearance workflow component 108 from one or more client computing platforms associated with a user. The clearance item information may be based on one or more of the user's selection and/or identification of the clearance items within the online content. A user may include one or more of an editing entity, a content manager, a content verifier, a content producer, a talent, and/or other user and/or entity that may control and/or modify the online content. In some implementations, a user may select and/or identify the clearance items within the online content via a graphical user interface. One or more prompts associated with the online content and/or identifying clearance items within the online content may be presented to the user within the graphical user interface to assist the user in identifying the clearance items. In some implementations, the identified and/or selected clearance items may be timestamped within the online content such that the time indications include the timestamps. As such, clearance workflow component 108 may identify the clearance workflow for a given online content based on the clearance item information obtained from one or more client computing platforms associated with the user.

In some implementations, clearance workflow component 108 may be configured to obtain the clearance item information from metadata associated with the online content. The metadata may be generated by processing the online content to identify one or more clearance items within the online content. For example, the online content may be processed using image recognition, voice to text translation, object recognition, music identification and processing, and/or other processing. The metadata may include one or more of the clearance items to be addressed for clearance of the online content, and/or time indications indicating points in time within the duration of the online content that one or more of the clearance items are directed to. As such, clearance workflow component 108 may identify the clearance workflow for a given online content based on the obtained metadata including the clearance items.

In some implementations, clearance workflow component 108 may be configured to determine one or more distribution platforms the online content should be distributed to. Identification of the clearance workflow may be based on the distribution platform to which the online content should be distributed and/or other information. In some implementations, the distribution platform to which the online content should be distributed may be selected and/or indicated by a user (e.g., an editing entity, talent, producer, content manager, and/or other user). The distribution platforms may have varying guidelines and/or requirements such that the clearance workflows may be different for different distribution platforms. The clearance workflows may indicate one or more guidelines the online content should meet and/or steps the online content should go through in order to be distributed via the corresponding distribution platform. In some implementations, the clearance workflows identified for individual ones of the distribution platforms may have one or more overlapping clearance items, and/or one or more differing clearance items.

Clearance workflow component 108 may be configured to store the clearance workflow in electronic storage 122. Storing the clearance workflow may include storing the identified clearance workflow including the itemized representation of clearance items in electronic storage 122, and/or other storage locations within system 100 and/or in communication with system 100 (e.g., external resources 120).

Editing component 110 may be configured to transmit the online content to a client computing platform associated with an editing entity for addressing one or more of the clearance items to be addressed for clearance of the online content. The editing entity may address one or more of the clearance items included in the itemized representation of clearance items. The editing entity may address one or more of the clearance items and/or modify the online content via a client computing platform associated with the editing entity and/or an interface associated with the editing entity. Responsive to the online content being transmitted to a client computing platform associated with an editing entity, and/or the editing entity addressing one or more of the clearance items, editing component 110 may be configured to generate fulfillment information identifying one or more of the clearance items that have been addresses. Editing component 110 may be configured to transmit the fulfillment information to fulfillment component 112.

In some implementations, editing component 110 may be configured to edit the online content. For example, editing component 110 may be configured to automatically and/or quick edit the online content. Editing component 110 may be configured to edit the online content according to the identified clearance workflow for the online content. Editing the online content may address one or more of the clearance items to be addressed for clearance of the online content. In some implementations, editing component 110 may be configured to address all of the clearance items included in the identified workflow. Editing component 110 may be configured to generate and/or transmit fulfillment information to fulfillment component 112.

Editing the online content according to the identified clearance workflow for the online content may include one or more of: removing, replacing, masking, and/or blurring out portions of the online content based on the clearance events; adjusting, adapting, converting, and/or modifying one or more parameters of the online content based on the parameter guidelines; modifying, adding, and/or removing supplemental content associated with the online content based on the supplemental content requirements; removing and/or replacing online content based on the content to be removed or replaced within the online content; and/or other editing. In some implementations, the editing may be based on time indications associated with the clearance items. The time indications may indicate points in time within the duration of the online content that the associated clearance items are directed to such that they may be used as a basis to determine the points in time that should be edited. In some implementations, editing component 110 may be configured to automatically verify rights associated with content in the online content, citations in the online content, and/or other verifiable information. For example, editing component 110 may identify the questionable and/or potentially protected content within the online content and compare it to content contained within a cleared content database (e.g., external resources 120).

For example, editing component 110 may address a clearance event indicating a copyrighted song playing from minute 1:02 to minute 1:31 within the online content, such that the copyrighted song is automatically replaced with 29 seconds of a pre-approved song within the online content. By way of another example, editing component 110 may address explicit content to be removed from minute 1:43 to 1:51 by automatically cutting the online content from 1:43 to 1:51. By way of another example, editing component 110 may address a parameter guideline for the online content indicating the title of an individual online content is too long by shortening the title of the online content to fall within the parameter guideline. By way of another example, editing component 110 may address a clearance event indicating a trademark presented within the online content at time indication :12 by automatically blurring the identified object (e.g., the trademark) within the online content at :12.

In some implementations, responsive to the identification of the clearance workflow being based on the distribution platform to which the online content should be distributed, the editing component 110 may be configured to edit the online content based on the distribution platform. Editing the online content based on the distribution platform may include addressing one or more clearance items within the itemized representation of clearance items according to the requirements for clearing the online for a given distribution platform. For example, a video may be cropped differently for various distribution platforms (e.g., the VINE®, INSTAGRAM®, FACEBOOK®, MSN®, DISH®, ROKU®, and/or other distribution platforms) because the various distribution platforms may have different parameter guidelines indicating a minimum and/or maximum length of the online content.

Fulfillment component 112 may be configured to obtain fulfillment information indicating that one or more of the clearance items included in the clearance workflow has been addressed. The fulfillment information may identify which of the one or more clearance items have been addressed. In some implementations, the fulfillment information may be obtained from one or more of editing component 110, a client computing platform associated with an editing entity and/or user, an interface associated with the editing entity, and/or other sources. An editing entity may include one or more users that edit the online content, verify one or more aspects (e.g., legal rights, permissions, credit citations, and/or other aspects) of the online content, manage the online content, and/or otherwise control and/or modify the online content. The fulfillment information may correspond to one or more clearance items included in the clearance workflow. As such, the fulfillment information may identify one or more the clearance items addressed and/or fulfilled.

Updating component 114 may be configured to update the clearance workflow. The clearance workflow may be updated in a reoccurring and/or ongoing manner. Updating component 114 may be configured to update the clearance workflow for the online content stored in the electronic storage 122. As such, the last clearance workflow, reflecting the last fulfillment information obtained, associated with a given online content may be stored within electronic storage 122. Updating the clearance workflow may include removing one or more clearance items identified by the fulfillment information from the itemized representation of clearance items that must be addressed for clearance of the online content. As such, the itemized representation of clearance items that must be addressed may reflect one or more remaining clearance items that have not yet been addressed.

Removing the one or more clearance items identified by the fulfillment information from the itemized representation of clearance items may include deleting the one or more clearance items and/or otherwise indicating the one or more clearance items have been fulfilled. For example, otherwise indicating the one or more clearance items have been fulfilled may include one or more of crossing out the one or more of the clearance items, indicating a check mark for the one or more clearance items, color-coding the one or more clearance items, displacing the one or more clearance items, and/or otherwise indicating the one or more clearance items has been fulfilled.

In some implementations, presentation component 116 may be configured to effectuate presentation of the itemized representation of clearance items to be addressed for a given online content. Effectuating presentation of the itemized representation may include transmitting clearance workflow information indicating the clearance workflow for the given online content to one or more client computing platform(s) 204 for display to a user (e.g., in a graphical user interface). In some implementations, the clearance workflow and/or itemized representation of the clearance items may be presented with the online content. In some implementations, the itemized representation of clearance items may prompt user input in order to address one or more clearance items. In some implementations, a status indicator (e.g., a mark indicator, a color indicator, and/or other indicator) identifying whether one or more clearance items have been addressed may be presented.

Figure 2:
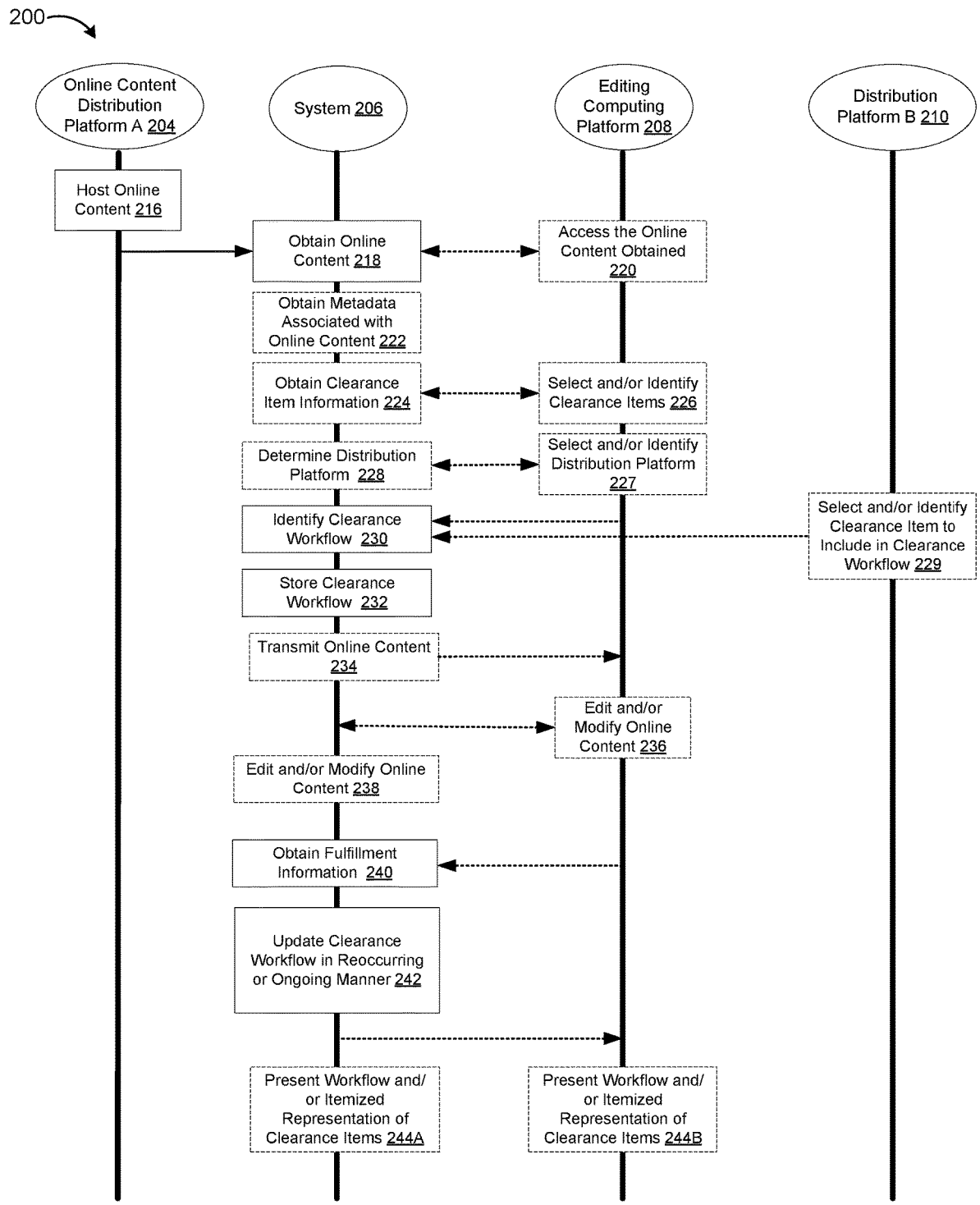
FIG. 2 illustrates a workflow process depicting the functionality of a system configured for providing clearance workflows for facilitating clearance of online content to be distributed, in accordance with one or more implementations.

FIG. 2 illustrates a workflow process 200 depicting the functionality of a system 206 configured for providing clearance workflows for facilitating clearance of online content to be distributed, in accordance with one or more implementations. The steps, entities, and/or platforms of workflow process 200 presented below are intended to be illustrative and non-limiting examples. In certain implementations, workflow process 200 may be accomplished with one or more additional steps, entities, and/or platforms not described, and/or without one or more of the steps, entities, and/or platforms discussed. Additionally, the order and direction in which the steps of workflow process 200 are illustrated in FIG. 2 and described below is not intended to be limiting.

System 206 may be the same as or similar to system 100 as illustrated in FIG. 1. Workflow process 200 may include multiple entities and/or platforms configured to communicate with system 206 including one or more of an online content distribution platform A 202, an editing computing platform 208, a distribution platform B 210, other entities, and/or other platforms.

Online content distribution platform A 204 may be configured to host online content at step 216. The online content may include online media content available to content consumers via online content distribution platform A 204 and/or other content distribution platforms. System 206 may be configured to obtain the online content from the online content distribution platform A 204, and/or other online content distribution platforms at step 218. At step 220, an editing entity associated with editing computing platform 208 may access the obtained online content via editing computing platform 208. In some implementations, at step 222, system 206 may obtain metadata associated with the online content. The metadata may be obtained in step 222 by processing the online content and/or generating the metadata, and/or otherwise obtaining the metadata. The metadata may include one or more clearance items to be addressed for clearance of the online content, and/or one or more time indications indicating points in time within the duration of the online content that the one or more clearance items are directed to. Editing computing platform 208 may be associated with one or more users and/or entities tasked with clearing, editing, reviewing, producing, creating, and/or modifying the online content for distribution. In some implementations, editing computing platform 208 may be associated with one or more users and/or entities tasked with identifying and/or selecting a distribution platform the online content should be distributed to (see e.g., step 227).

In some implementations, at step 224, clearance item information may be obtained. The clearance item information may indicate the clearance items to be addressed for clearance of the online content. The clearance item information may be obtained from one or more client computing platforms associated with a user (e.g., editing computing platform 208). In some implementations, the clearance item information may be based on the user's (e.g., an editing entity, a talent, a content manager, and/or other user's) selection and/or identification of the clearance items within the online content via editing computing platform 208 at step 226. In some implementations, the clearance item information may be obtained from metadata associated with the online content and obtained in step 222. In some implementations, system 206 may be configured to determine, at step 228, a distribution platform the online content should be distributed to. In some implementations, the distribution platform the online content should be distributed to may be selected and/or identified by a user (e.g., an editing entity, talent, producer, content manager, and/or other user) via editing computing platform 208 at step 227.

At step 230, system 206 may be configured to identify a clearance workflow. The clearance workflow may include an itemized representation of clearance items to be addressed for clearance of the online content. Identification of the clearance workflow at step 230 may be based on one or more of the distribution platform to which the online content should be distributed, the clearance item information obtained at step 224 (e.g., from editing computing platform 208, the metadata obtained at step 222, and/or other sources), and/or other information. In some implementations, one or more entities (e.g., distribution partners, and/or other users) may identify and/or select one or more clearance items to be included in the clearance workflow at step 229. At step 232, the clearance workflow may be stored by system 206.

In some implementations, at step 234, the online content may be transmitted to editing computing platform 208 for an editing entity to address one or more of the clearance items. In some implementations, the online content may be edited and/or modified by an editing entity, talent, content manager, and other user at step 236. In some implementations, at step 238, system 206 may be configured to edit and/or modify the online content. Editing and/or modifying the online content (e.g., at step 236, 238, and/or other steps) may include generating fulfillment information indicating that one or more of the clearance items included in the clearance workflow have been addressed. At step 240, system 206 may be configured to obtain fulfillment information, wherein the fulfillment information identifies which of the one or more clearance items have been addressed by system 206 and/or editing computing platform 208 at one or more of step 236, step 238, and/or other steps.

System 206 may update the clearance workflow based on the obtained fulfillment information at step 242. The clearance workflow may be updated in a reoccurring or ongoing manner. At step 242, the updated workflow and/or itemized representation of clearance items to be addressed may be presented to one or more users and/or editing entities via system 206, editing computing platform 208, and/or other platforms. One or more of steps 216-244 may be repeated until all of the clearance items included in the itemized representation of clearance items have been addressed.

Returning to FIG. 1, the server(s) 102, client computing platforms 104, and/or external resources 36 may be operatively linked via one or more electronic communication links. For example, such electronic communication links may be established, at least in part, via a network 130 such as the Internet and/or other networks. It will be appreciated that this is not intended to be limiting and that the scope of this disclosure includes implementations in which server(s) 102, client computing platforms 104, and/or external resources 124 may be operatively linked via some other communication media.

The external resources 120 may include sources of information, hosts and/or providers of virtual spaces outside of system 100, external entities participating with system 100, external entities for digital content and/or digital content platforms, and/or other resources. In some implementations, some or all of the functionality attributed herein to external resources 120 may be provided by resources included in system 100.

The server(s) 102 may include electronic storage 122, one or more processor(s) 124, and/or other components. The server(s) 102 may include communication lines or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may comprise electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port or a drive. A port may include a USB port, a firewire port, and/or other port. A drive may include a disk drive and/or other drive. Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 are configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 are shown in FIG. 1 as a single entity, this is for illustrative purposes only. In some implementations, processor(s) 124 may include one or more processing units. These processing units may be physically located within the same device, or processor(s) 124 may represent processing functionality of a plurality of devices operating in coordination. The processor 124 may be configured to execute components 106-114. Processor 124 may be configured to execute components 108, 110, 111, 112, 114, and/or 116 by software; hardware; firmware; some combination of software, hardware, and/or firmware; and/or other mechanisms for configuring processing capabilities on processor(s) 124.

It should be appreciated that although components 106-116 are illustrated in FIG. 1 as being located and/or co-located within a particular component of system 100, in implementations in which physical processor(s) 124 include multiple processing units, one or more of components 106-116 may be located remotely from the other components. The description of the functionality provided by the different components 106-116 described herein is for illustrative purposes, and is not intended to be limiting, as any of components 106-116 may provide more or less functionality than is described. For example, one or more of components 106-116 may be eliminated, and some or all of its functionality may be incorporated, shared, integrated into, and/or otherwise provided by other ones of components 106-116. Note that physical processor(s) 124 may be configured to execute one or more additional components that may perform some or all of the functionality attributed herein to one of components 106-116.

One or more of the components of system 100 may be configured to present and/or provide a user interface (see e.g., user interface 200 of FIG. 2) to provide an interface between system 100 and a user (e.g. an editing entity, talent, producer, content manager, and/or other users using a graphical user interface) through which the user can provide information to and receive information from system 100. This enables data, results, and/or instructions (e.g., determinations, selections, and/or other indications) and any other communicable items, collectively referred to as "information," to be communicated between the user and system 100. Examples of interface devices suitable for inclusion in a user interface include one or more of those associated with a computing platform, a keypad, buttons, switches, a keyboard, knobs, levers, a display screen, a touch screen, a mouse, speakers, a microphone, an indicator light, an audible alarm, and/or a printer. Information may be provided to a user by the user interface in the form of a graphical user interface.

It is to be understood that other communication techniques, either hard-wired or wireless, are also contemplated herein as a user interface. For example, in one embodiment, the user interface may be integrated with a removable storage interface provided by electronic storage 122. In this example, information is loaded into system 100 from removable storage (e.g., a smart card, a flash drive, a removable disk, etc.) that enables the user(s) to customize system 100. Other exemplary input devices and techniques adapted for use with system 100 as the user interface include, but are not limited to, an RS-232 port, RF link, an IR link, modem (telephone, cable, Ethernet, internet or other). In short, any technique for communicating information with system 100 is contemplated as the user interface.

Figure 3:
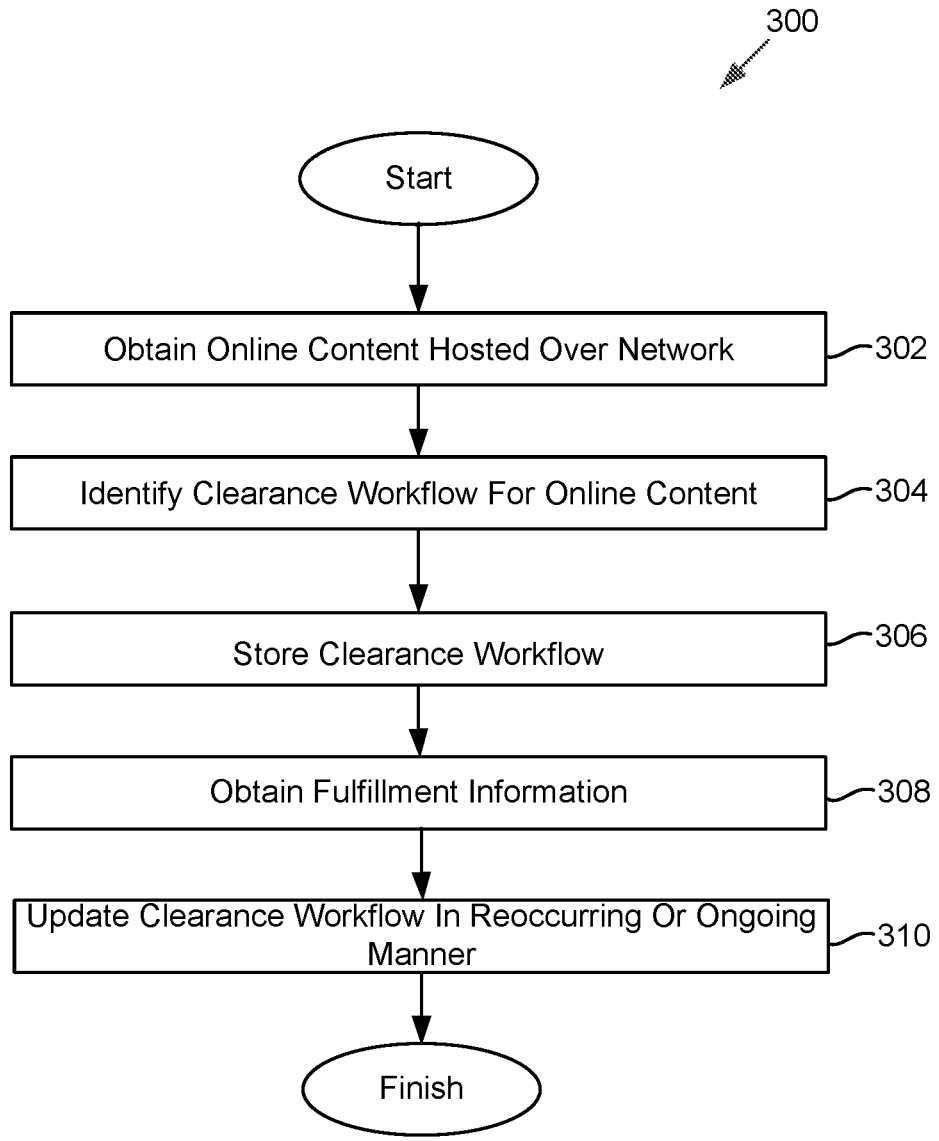
FIG. 3 illustrates a method for providing clearance workflows for facilitating clearance of online content to be distributed, in accordance with one or more implementations.

FIG. 3 illustrates an exemplary method 300 for providing clearance workflows for facilitating clearance of online content for distribution platforms, in accordance with one or more implementations. The operations of method 300 presented below are intended to be illustrative and non-limiting examples. In certain implementations, method 300 may be accomplished with one or more additional operations not described, and/or without one or more of the operations discussed. Additionally, the order in which the operations of method 300 are illustrated in FIG. 3 and described below is not intended to be limiting.

In certain implementations, method 300 may be implemented in one or more processing devices (e.g., a digital processor, an analog processor, a digital circuit designed to process information, an analog circuit designed to process information, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

Regarding method 300, at an operation 302, online content may be obtained. The online content may be hosted over a network. The online content may be obtained from one or more sources. In some implementations, operation 302 is performed by a content component the same as or similar to content component 106 (shown in FIG. 1 and described herein).

At an operation 304, a clearance workflow may be identified for the online content. The clearance workflow may include an itemized representation of clearance items to be addressed for clearance of the online content. The clearance items may include one or more of clearance events occurring within a duration of the online content, parameter guidelines for the online content, supplemental content requirements for the online content, content to be removed or replaced within the duration of the online content, and/or other clearance events occurring within the duration of the online content. One or more of the clearance items may be associated with time indications indicating points in time within the duration of the online content that the associated clearance items are directed to. In some implementations, operation 304 is performed by a clearance workflow component the same as or similar to clearance workflow component 108 (shown in FIG. 1 and described herein).

At an operation 306, the clearance workflow may be stored in electronic storage. The clearance workflow stored may include the itemized representation of clearance items. In some implementations, operation 306 is performed by a clearance workflow component the same as or similar to clearance workflow component 108 (shown in FIG. 1 and described herein).

At an operation 308, fulfillment information may be obtained. The fulfillment information may indicate that one or more of the clearance items included in the clearance workflow has been addressed. The fulfillment information may identifies which of the one or more clearance items have been addressed. In some implementations, operation 308 is performed by a fulfillment component the same as or similar to fulfillment component 112 (shown in FIG. 1 and described herein).

At an operation 310 the clearance workflow stored in the electronic storage for the online content may be updated. The clearance workflow may be updated in a reoccurring or ongoing manner. Updating the clearance workflow may include removing the one or more clearance items identified by the fulfillment information from the itemized representation of clearance items that must be addressed for clearance of the online content. In some implementations, operation 310 is performed by an updating component the same as or similar to updating component 114 (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system configured for providing clearance workflows for facilitating clearance of online content for distribution platforms, the system comprising:
one or more physical processors configured by machine-readable instructions to:
obtain online content hosted over a network from one or more sources, the online content including an individual online content;
identify a clearance workflow for the individual online content, wherein the clearance workflow includes an itemized representation of clearance items, wherein clearance items in the itemized representation of clearance items are to be addressed for clearance of the individual online content, the clearance items including clearance events occurring within a duration of the individual online content, wherein individual clearance events are associated with time indications indicating individual points in time when the individual clearance events occur;
store the clearance workflow including the itemized representation of clearance items in electronic storage;
automatically edit the individual online content according to the clearance workflow for the individual online content, wherein automatically editing the individual online content addresses at least one of the clearance items to be addressed for clearance of the individual online content;
obtain fulfillment information indicating that one or more of the clearance items included in the clearance workflow have been addressed, wherein the fulfillment information identifies the one or more of the clearance items that have been addressed, and wherein the one or more of the clearance items identified by the fulfillment information include the at least one of the clearance items addressed through the automatic editing; and
in a reoccurring manner as the one or more of the clearance items are addressed, update the clearance workflow stored in the electronic storage for the individual online content, wherein updating the clearance workflow includes removing the one or more of the clearance items identified by the fulfillment information from the itemized representation of clearance items to generate an updated itemized representation of clearance items such that the updated itemized representation of clearance items reflects one or more remaining clearance items that have not yet been addressed.

2. The system of claim 1, wherein the one or more physical processors are further configured by the machine-readable instructions to:
transmit the individual online content to a client computing platform associated with an editing entity for addressing at least an other one of the clearance items to be addressed for clearance of the individual online content, wherein at least some of the fulfillment information is obtained from the client computing platform associated with the editing entity, an interface associated with the editing entity, or a combination thereof.

3. The system of claim 1, wherein the one or more physical processors are further configured by the machine-readable instructions to:
obtain clearance item information indicating the clearance items to be addressed for clearance of the individual online content.

4. The system of claim 3, wherein the clearance item information includes the time indications.

5. The system of claim 3, wherein the clearance item information is obtained from one or more client computing platforms associated with a user such that the clearance item information is based on a selection by the user, an identification by the user, or a combination thereof of the clearance items within the individual online content.

6. The system of claim 3, wherein the clearance item information is obtained from metadata associated with the individual online content, wherein the metadata includes the clearance items to be addressed for clearance of the individual online content and the time indications.

7. The system of claim 1, wherein the one or more physical processors are further configured by the machine-readable instructions to:
determine one or more distribution platforms the individual online content should be distributed to,
such that the identification of the clearance workflow is based on the one or more distribution platforms to which the individual online content should be distributed.

8. The system of claim 1, wherein the clearance events further include presentation of a specific type of content within the individual online content, presentation of content related to a specified topic within the individual online content, or a combination thereof.

9. The system of claim 1, wherein the clearance items further include parameter guidelines for the individual online content, the parameter guidelines for the individual online content describing requirements for a length of the individual online content, a size of the individual online content, resolution of the individual online content, a format of the individual online content, or a combination thereof.

10. The system of claim 1, wherein the clearance items further include supplemental content requirements for the individual online content, the supplemental content requirements for the individual online content including requirements for metadata, thumbnail information, a tag, a title, an advertisement, an end plate, a description, a caption associated with the individual online content, or a combination thereof.

11. The system of claim 1, wherein the clearance items further include content to be removed or replaced within the duration of the individual online content, the content to be removed or replaced within the duration of the individual online content including cropped content, audio content, explicit content, undesired content, or a combination thereof.

12. A method for providing clearance workflows for facilitating clearance of online content for distribution platforms, the method being implemented by a computer system including one or more physical processors configured by machine readable instructions, the method comprising:
   obtaining online content hosted over a network from one or more sources, the online content including an individual online content;
identifying a clearance workflow for the individual online content, wherein the clearance workflow includes an itemized representation of clearance items, wherein clearance items in the itemized representation of clearance items are to be addressed for clearance of the individual online content, the clearance items including clearance events occurring within a duration of the individual online content, wherein individual clearance events are associated with time indications indicating individual points in time when the individual clearance events occur;
   storing the clearance workflow including the itemized representation of clearance items in electronic storage;
   automatically editing the individual online content according to the clearance workflow for the individual online content, wherein automatically editing the individual online content addresses at least one of the clearance items to be addressed for clearance of the individual online content;
   obtaining fulfillment information indicating that one or more of the clearance items included in the clearance workflow have been addressed, wherein the fulfillment information identifies the one or more of the clearance items have been addressed, and wherein the one or more of the clearance items identified by the fulfillment information include the at least one of the clearance items addressed through the automatic editing; and
   in a reoccurring manner as the one or more of the clearance items are addressed, updating the clearance workflow stored in the electronic storage for the individual online content, wherein updating the clearance workflow includes removing the one or more of the clearance items identified by the fulfillment information from the itemized representation of clearance items to generate an updated itemized representation of clearance items such that the updated itemized representation of clearance items reflects one or more remaining clearance items that have not yet been addressed.

13. The method of claim 12, further comprising:
transmitting the individual online content to a client computing platform associated with an editing entity for addressing at least an other one of the clearance items to be addressed for clearance of the individual online content, wherein at least some of the fulfillment information is obtained from the client computing platform associated with the editing entity, an interface associated with the editing entity, or a combination thereof.

14. The method of claim 12, further comprising:
obtaining clearance item information indicating the clearance items to be addressed for clearance of the individual online content.

15. The method of claim 14, wherein the clearance item information includes the time indications.

16. The method of claim 14, wherein the clearance item information is obtained from one or more client computing platforms associated with a user such that the clearance item information is based on a selection by the user, an identification by the user, or a combination thereof of the clearance items within the individual online content.

17. The method of claim 14, wherein the clearance item information is obtained from metadata associated with the individual online content, wherein the metadata includes the clearance items to be addressed for clearance of the individual online content and the time indications.

18. The method of claim 12, further comprising:
determining one or more distribution platforms the individual online content should be distributed to,
such that the identification of the clearance workflow is based on the one or more distribution platforms to which the individual online content should be distributed.

19. The method of claim 12, wherein the clearance events further include presentation of a specific type of content within the individual online content, presentation of content related to a specified topic within the individual online content, or a combination thereof.

20. The method of claim 12, wherein the clearance items further include parameter guidelines for the individual online content, the parameter guidelines for the individual online content describing requirements for a length of the individual online content, a size of the individual online content, resolution of the individual online content, a format of the individual online content, or a combination thereof.

21. The method of claim 12, wherein the clearance items further include supplemental content requirements for the individual online content, the supplemental content requirements for the individual online content including requirements for metadata, thumbnail information, a tag, a title, an advertisement, an end plate, a description, a caption associated with the individual online content, or a combination thereof.

22. The method of claim 12, wherein the clearance items further include content to be removed or replaced within the duration of the individual online content, the content to be removed or replaced within the duration of the individual online content includes cropped content, audio content, explicit content, undesired content, or a combination thereof.

* * * * *